United States Patent [19]

Stoneberg

[11] 4,314,004
[45] Feb. 2, 1982

[54] FLUOROCARBON RESIN COATED SUBSTRATES AND METHODS OF MAKING

[75] Inventor: Richard L. Stoneberg, Pittsburgh, Pa.

[73] Assignee: PPG Industries, Inc., Pittsburgh, Pa.

[21] Appl. No.: 163,353

[22] Filed: Jun. 26, 1980

[51] Int. Cl.³ ............................................. B32B 11/04
[52] U.S. Cl. .................................. 428/421; 428/463; 428/416; 427/409; 427/407.1
[58] Field of Search ........................... 427/409, 407.1; 428/421, 416

[56] References Cited

U.S. PATENT DOCUMENTS

| | | | |
|---|---|---|---|
| 3,470,014 | 9/1969 | Koblitz | 427/409 |
| 3,859,120 | 1/1975 | Schramm | 428/221 |
| 3,953,643 | 4/1976 | Cheung | 428/220 |
| 4,141,873 | 2/1979 | Dohany | 428/421 |

Primary Examiner—Sam Silverberg
Attorney, Agent, or Firm—Charles R. Wilson

[57] ABSTRACT

Methods of providing substrates with a durable coating comprises applying a pigmented composition of fluorocarbon resin and acrylic resin to the substrate followed by application of a clear composition of flurocarbon resin and acrylic resin. Articles produced by the methods are especially useful wherever outdoor exposure is encountered.

16 Claims, No Drawings

FLUOROCARBON RESIN COATED SUBSTRATES AND METHODS OF MAKING

This invention relates to methods of coating substrates and articles produced therefrom. More particularly, the methods relate to providing substrates with coatings which are durable.

Substrates have long been coated to provide them with a pigmented coating for appearance purposes as well as to provide them with a durable coating for protective purposes. Coated substrates which are used outdoors are particularly susceptible to changes in appearance and loss of durability due to the coating either fading or deteriorating. For example, building panels and other articles made from sheet metal for outdoor use are in need of pigmented coatings. Pigmented coatings provided by the prior art leave much to be desired in their ability to retain their appearance and to protect the substrate during prolonged exposure to the weather. One drawback evident with prior art coating compositions recommended for use in building panels is the fact the choice of pigment used with such compositions is rather limited. That is, many pigments are susceptible of fading or changing color during prolonged exposure. This, of course, is undesirable. While certain pigments are better able to withstand exposure to the weather conditions, this necessarily limits the choice available to the manufacturer.

Fluorocarbon resins are known for their outstanding durability. Their durability in terms of providing a tough finish as well as providing a finish which will not craze or chalk with changing weather conditions is well known. Fluorocarbon resins have been recommended and are used in the building panel industry. Unfortunately, the use of pigments which can be used in combination with the fluorocarbon resins is limited to the more weather-resistant pigments.

Accordingly, there is a need for a method of providing a substrate with a durable finish which is not limited with respect to the choice of pigments available. Coated substrates resulting from the method should be durable.

As used herein, all percentages and ratios are by weight unless otherwise indicated.

SUMMARY OF THE INVENTION

Methods of providing durable coated substrates comprise the steps of (a) applying a pigmented coating composition to a substrate wherein the composition consists essentially of, on a resin solids basis, of from about 45% to about 85% of a fluorocarbon resin and from about 15% to about 55% of an acrylic resin and a pigment at a pigment volume concentration of from about 3% to about 55%, (b) applying a clear coating composition to the coated substrate of step (a) wherein the clear composition consists essentially of, on a resin solids basis, of from about 45% to about 85% of a fluorocarbon resin and from about 15% to about 55% of an acrylic resin and (c) baking the coated substrate of step (b) so as to cause the coatings to fuse together in a bonding process to provide good intercoat adhesion and craze resistance. The methods are particularly useful for the coating of primed metal substrates.

DETAILED DESCRIPTION OF THE INVENTION

The methods of this invention comprise applying a pigmented coating composition to a substrate followed by applying a clear coating composition to the substrate. Further details as to the substrates, coating compositions, methods of application and articles produced by the methods are given in the succeeding paragraphs.

The methods of coating provided by this invention are used with many different substrates including metal, plastic, wood, masonry, wallboard, leather and fabrics. They are particularly useful for the coating of metal substrates. The substrates can be initially coated with a primer composition (as described in detail hereinafter) or the compositions described in detail hereinafter can be applied to unprimed substrates. The substrate of most interest is a primed metal substrate such as primed aluminum or steel. These coated substrates are especially useful in the building panels industries. The substrates to be coated are usually fabricated to their desired shape prior to the coating steps; though, because of the excellent flexibility of the coating compositions used in the methods of this invention, it is possible to coat flat coils of substrate and then fabricate the desired coated article.

Pigmented coating compositions used in step (a) of the herein described invention consist essentially of, on a resin solids basis, from about 45% to about 85% of a fluorocarbon resin and from about 15% to about 55% of an acrylic resin. Additionally, the compositions contain a pigment at a pigment volume concentration (PVC), on a dry film basis, of from about 3% to about 55%. Generally, an organic solvent is used as a carrier for the resin solids and pigment. The level of solvent in the compositions can vary widely depending on the particular resin system, pigment, mode of application and film thickness desired. A typical level of solvent ranges from about 40 percent to about 75 percent of the total composition. Preferred compositions consist essentially of, on a resin solids basis, from about 65% to about 75% of the fluorocarbon resin and from about 25% to about 35% of the acrylic resin. Preferred compositions also have a PVC of from about 5% to about 40 and contain from about 50% to about 65% solvent.

Several different fluorocarbon resins are useful herein. Such resins include the polyvinyl fluorides, polyvinylidene fluorides, vinyl fluoride copolymers and vinylidene fluoride copolymers. These resins are described in more detail in U.S. Pat. Nos. 2,419,010, 2,510,783, 2,435,537, 2,935,818, 2,468,054 and 2,970,988, the disclosures of which are herein incorporated by reference. The preferred fluorocarbon resin is a polyvinylidene fluoride.

The acrylic resins used in combination with the aforedescribed fluorocarbon resin can be a thermoplastic or thermosetting acrylic resin. However, the thermoplastic resins are especially useful herein. The thermoplastic acrylic resins are the polymerized ester derivatives of acrylic acid and methacrylic acid. The esters are formed by the reaction of the acrylic or methacrylic acid with suitable alcohols, for example, methyl alcohol, ethyl alcohol, propyl alcohol, butyl alcohol and 2-ethylhexyl alcohol. Generally speaking the larger the alcohol portion of the ester, the softer and more flexible the resultant resin. Also, generally speaking, the methacrylic esters form harder films than the corresponding acrylic esters. Monomers, such as styrene, vinyl toluene, vinyl chloride, and vinylidene chloride can be reacted with the acrylic and methacrylic esters so as to produce resins with excellent properties. An especially satisfactory resin is a copolymer of methyl methacrylate and ethyl acrylate, having a molecular weight of between about 50,000 and about 150,000.

Thermosetting acrylic resins are normally low molecular weight copolymers made from two and sometimes three monomers. Many such resins are known and can be used here. One of the monomers is an acrylic compound containing pendant reactive groups such as hydroxyl or amide. Another is an acrylic acid. The third monomer is usually a styrene-type monomer such as styrene itself, vinyl toluene, methyl styrene or ethyl styrene. The proportions of the three components in the polymerization procedure are varied depending on the products in which the copolymer will be used.

Several different pigments can be used in the compositions. Inorganic pigments which are useful include titanium dioxide, silica, iron oxides, talc, mica, clay, zinc oxide, zinc sulphide, zirconium oxide, carbon black, lead chromate, metallic pigments, molybdate orange, calcium carbonate, and barium sulfate. Organic pigments can also be used herein. Particularly noteworthy is the fact the metallic pigments as above outlined can be used in this invention without changing appearances due to fading.

Suitable solvents include the aromatic petroleum distillates, cyclohexane, methyl ethyl ketone, methyl isobutyl ketone, alcohols such as ethyl alcohol, propyl alcohol and diacetone alcohol, dimethyl phthalate, and mono- and dialkyl ethers of ethylene and diethylene glycol, such as ethylene glycol monoethyl ether, ethylene glycol monobutyl ether, ethylene glycol monoethyl ether acetate, diethylene glycol monobutyl ether and diethylene glycol diethyl ether.

The substrate after being coated with the above described composition is preferably next air-dryed or baked. A baking temperature ranging from 210° C. to about 260° C. can be used. As known in the coatings art, however, it is possible the coated substrate can be subsequently coated without being dried. This is referred to as wet on wet coating. The film thickness of the coating when dried ranges from about 0.7 to about 2.0 mils.

A clear coating composition is next applied which consists essentially of, on a resin solids basis, from about 45% to about 85% of a fluorocarbon resin and from about 15% to about 55% of an acrylic resin. A liquid carrier such as the above described organic solvents and/or water is used. A preferred clear coating composition consists essentially of, on a resin solids basis, from about 65% to about 75% of the fluorocarbon resin and from about 25% to about 35% of the acrylic resin. The fluorocarbon resins and the acrylic resins above described are used in the clear coating composition. The preferred fluorocarbon resin is a polyvinylidene fluoride and the preferred acrylic resin is a thermoplastic resin. The dry film thickness of the clear coating varies between 0.3 mils and 1.0 mils.

The substrate, coated with the pigmented coating composition and the clear coating composition, is next baked at a temperature of from about 210° C. to about 260° C. This baking step has the effect of removing the solvent as well as causing the two coating layers to fuse together in a bonding process. It has been found the bonding process has the effect of giving the coated substrates good intercoat adhesion and craze resistance. In this regard the use of a thermoplastic acrylic resin in each of the coating compositions is preferred. The thermoplastic acrylic resin has the ability of fusing so as to better provide for the separate pigmented and clear coatings to bond together. This is to be contrasted with the use of a thermosetting acrylic resin wherein the pigmented and clear coatings on the substrate appear to be separate layers. While the latter product is satisfactory, the intercoat adhesion and craze resistance of the coatings is not as good as when a thermoplastic acrylic resin is used. Evidence of the durability of the coated substrates is the fact substrates coated by the method of this invention are able to withstand 5 years of south Florida exposure at a 45° angle with a color change of less than 5 Delta E units.

Conventional additives can be included in either or both of the above described coating compositions. Thus, surfactants, antioxidants, ultraviolet light absorbers, stabilizers, lubricants, coalescing agents and suspension agents can be added as needed. Optionally, as above discussed, it is sometimes desirable that the substrate be primed prior to the application of the pigmented coating composition. The need for the primer is dependent upon the particular substrate used. Thus, a metal substrate must be primed prior to being coated with the pigmented coating composition. Many primers useful for this purpose are known. Typically they are epoxy or acrylic-type primers.

A particularly preferred primer composition consists essentially of, on a resin solids basis, from about 3% to about 20% of a polyepoxide resin, from about 30% to about 96% of an acrylic resin, and from about 1% to about 50% of a fluorocarbon resin. Most preferred primer compositions consist essentially of, on a resin solids basis, from about 8% to about 12% of the polyepoxide resin, from about 76% to about 84% of the acrylic resin and from about 8% to about 12% of the fluorocarbon resin. Any of several different polyepoxide resins can be used, examples of which are found in *Handbook of Epoxy Resins,* Lee and Neville, 1967, McGraw-Hill Book Company. The above described acrylic resins and fluorocarbon resins can be used as well in the primer compositions. These preferred primer compositions are especially useful in the method of this invention because of the good intercoat adhesion between the primer coat and pigmented coat. Most likely, the good intercoat adhesion results from the presence of fluorocarbon resin in both coatings.

The following examples illustrate the advantages achieved using the methods of this invention.

EXAMPLE I

Chromate pretreated aluminum building panels are given a primer coat, pigmented coat and clear coat using the following formulations.

| Primer Coating Composition | Parts by Weight |
| --- | --- |
| Thermoplastic acrylic resin dispersion (40% solids) (1) | 6 |
| Fluorocarbon resin (2) | 24 |
| Thermosetting acrylic resin dispersion (50% solids) (3) | 411 |
| Epoxy resin (4) | 38 |
| Dimethyl phthalate | 6 |
| Ethylene glycol monobutyl ether | 7 |
| Ethylene glycol monoethyl ether acetate | 9 |
| Xylene | 8 |
| Aromatic petroleum solvent (5) | 68 |
| Diacetone alcohol | 161 |
| Bentonite clay | 4 |
| Ethyl alcohol | 1 |
| Strontium chromate | 36 |
| Titanium dioxide | 88 |
| Barium sulfate | 152 |

-continued

| Primer Coating Composition | Parts by Weight |
|---|---|
| Diethylene glycol monobutyl ether | 8 |

(1) Methyl methacrylate-ethyl acrylate copolymer dispersion available from Rohm & Haas Co. as Acryloid B-44.
(2) Polyvinylidene fluoride resin available from Pennwalt Corp. as Kynar 500.
(3) Interpolymer of ethyl acrylate/methacrylonitrile/methacrylic acid/acrylamide, 72.5/20/2.5/5.0.
(4) Available from Shell Chem. Co. as EPON 1001.
(5) Available from Humble Oil and Refining Co. as Solvesso 100.

| Pigmented Coating Composition | Parts by Weight |
|---|---|
| Fluorocarbon resin (1) | 212 |
| Thermoplastic resin dispersion (40% solids) (1) | 227 |
| Ethylene glycol monoethyl ether acetate | 104 |
| Dimethyl phthalate | 77 |
| Xylene | 111 |
| Bentonite clay | 3 |
| Ethyl alcohol | 1 |
| Toluene | 17 |
| Ethylene glycol monobutyl ether | 103 |
| Aluminum Paste (65% solids) | 54 |

(1) As used in the primer coating composition

A blend of the fluorocarbon resin, thermoplastic resin, ethylene glycol monoethyl ether acetate, 70 parts of the dimethyl phthalate, 52 parts of the xylene, bentonite clay and ethyl alcohol is sandmilled to a 5.5 Hegman grade. The equipment is washed out with 59 parts xylene and then the remaining components are blended in.

| Clear Coating Composition | Parts by Weight |
|---|---|
| Fluorocarbon resin (1) | 242 |
| Thermoplastic resin dispersion (40% dispersion) (1) | 259 |
| Ethylene glycol monoethyl ether acetate | 110 |
| Dimethyl phthalate | 86 |
| Xylene | 105 |
| Ethylene glycol monobutyl ether | 91 |
| Toluene | 15 |

(1) As used in the primer coating composition

The fluorocarbon resin, 172 parts of the acrylic resin dispersion, 78 parts of the ethylene glycol monoethyl ether acetate and 80 parts of the dimethyl phthalate are blended with the aid of a Cowles dissolver. The blend is next dispersed to a 5.5 Hegman grade. Xylene is used to wash out the equipment and the balance of the composition blended in.

Building panels mentioned above are first given a primer coat by mixing two parts of the above primer composition with one part toluene, by volume, and spraying the resultant blend onto the panels. The coating is flashed for 10 minutes, and then cured at 180° C. for 10 minutes to give a 0.25 dry film thickness. Next, the pigmented coating composition is reduced 2.5 parts to 1 part methyl ethyl ketone and 0.04 parts diethylene glycol monobutyl ether, by volume. A 1.0 mil dry film thickness coating is applied to the primed panels by spraying the pigmented composition onto the panels, flashing for 10 minutes and baking at 240° C. for 10 minutes. The clear coat is applied using 4 parts clear composition and 1 part methyl isobutyl ketone, by volume. The blend is sprayed at a level sufficient to provide a 0.5 mil dry film thickness after flashing for 10 minutes and curing at 240° C. for 10 minutes.

The final coated panel has excellent appearance and excellent durability as measured by its acid resistance, alkaline resistance and UV resistance. The acid resistance is determined by placing a 10% nitric acid solution on the coated panel and noting no staining after 2 hours. The alkaline resistance is determined by placing mortar on the coated panel, and exposing the panel to a temperature of 38° C. and 100% relative humidity for 24 hours. No staining is observed. The UV resistance and light fastness is tested by exposing the coated panel to 3000 hours light exposure in an Atlas QUV Cabinet and observing no color change or loss in gloss. Additionally no noticeable fading or significant gloss change is observed after 9 months of accelerated exterior exposure in EMMAQUA testing (equivalent to five years south Florida exposure).

What is claimed is:

1. A method of providing a durable coated substrate, comprising the steps of:
   (a) applying a pigmented coating composition to a substrate, said composition consisting essentially of from about 45% to about 85% of a fluorocarbon resin and from 15% to about 55% of a thermoplastic acrylic resin, on a resin solids basis, and having a PVC of from about 3% to about 55%, on a dry film basis; and
   (b) applying a clear coating composition to the coated substrate of step (a), said composition consisting essentially of from about 45% to about 85% of a fluorocarbon resin, and from about 15% to about 55% of a thermoplastic acrylic resin, on a resin solids basis; and
   (c) baking the coated substrate of step (b) to cause the coatings to fuse together intimately in a bonding process to provide good intercoat adhesion and craze-resistance, thereby forming the coated substrate.

2. The method of claim 1 wherein the substrate is a primed metal substrate.

3. The method of claim 2 wherein the metal substrate is primed with an epxoy or acrylic resin composition.

4. The method of claim 3 wherein the primer composition consists essentially of from about 3% to about 20% of a polyepoxide resin, from about 30% to about 96% of an acrylic resin and from about 1% to about 50% of a fluorocarbon resin.

5. The method of claim 4 wherein the coated substrate of step (a) is baked at about 210° C. to about 260° C. prior to application of the clear coating composition.

6. The method of claim 5 wherein the coated substrate of step (b) is baked at a temperature of from about 210° C. to about 260° C.

7. The method of claim 6 wherein the dry film thickness of the pigmented coating ranges from about 0.7 mils to about 2.0 mils and the dry film thickness of the clear coating ranges from about 0.3 mils to about 1.0 mils.

8. The method of claim 7 wherein the coated substrate of step (c) changes less than 5 Delta E color units after five years of south Florida exposure at a 45° angle.

9. The method of claim 8 wherein the composition of step (a) consists essentially of from about 65% to about 75% of the fluorocarbon resin and from about 25% to about 35% of the acrylic resin, on a resin solids basis.

10. The method of claim 9 wherein the composition used in step (b) consists essentially of from about 65% to about 75% of the fluorocarbon resin and from about 25% to about 35% of the acrylic resin, on a resin solids basis.

11. The method of claim 10 wherein the fluorocarbon resin used in the composition of steps (a) and (b) is polyvinylidene fluoride.

12. The method of claim 11 wherein the acrylic resin used in the compositions of steps (a) and (b) is a methyl methacrylate-ethyl acrylate polymer having a molecular weight of from about 50,000 to about 150,000.

13. The method of claim 12 wherein the metal substrate is steel.

14. The method of claim 12 wherein the metal substrate is aluminum.

15. An article produced by the method of claims 1 or 13.

16. The article of claim 15 wherein the metal substrate is aluminum.

* * * * *